United States Patent [19]

Knoll

[11] 4,251,353

[45] * Feb. 17, 1981

[54] METHOD OF TREATING REFUSE TO SEPARATE VALUABLE CONSTITUENTS

[76] Inventor: Frank S. Knoll, 4120 Haines St., Jacksonville, Fla. 32206

[*] Notice: The portion of the term of this patent subsequent to Jan. 27, 1998, has been disclaimed.

[21] Appl. No.: 959,753

[22] Filed: Nov. 13, 1978

Related U.S. Application Data

[63] Continuation-in-part of Ser. No. 852,740, Nov. 18, 1977, abandoned.

[51] Int. Cl.³ .............................................. B03C 7/06
[52] U.S. Cl. .............................. 209/129; 209/127 R
[58] Field of Search .............................. 209/127–131, 209/12, 3, 9

[56] References Cited

U.S. PATENT DOCUMENTS

| | | | |
|---|---|---|---|
| 865,711 | 7/1907 | Kitsee | 209/129 |
| 1,744,967 | 1/1930 | Johnson | 209/131 |
| 2,445,227 | 7/1948 | Musse | 209/127 C |
| 2,559,076 | 7/1951 | Johnson | 209/127 A |
| 3,322,275 | 5/1967 | Breakiron | 209/127 R |
| 3,370,703 | 2/1968 | Carpenter | 209/127 R |
| 3,477,568 | 11/1969 | Madrid | 209/127 R |
| 3,897,330 | 3/1973 | Rhys | 209/128 X |
| 3,941,685 | 3/1976 | Singeunld | 209/127 R |
| 3,970,546 | 7/1976 | Webb | 209/128 X |
| 4,116,822 | 9/1978 | Webb | 209/12 X |

FOREIGN PATENT DOCUMENTS

| | | | |
|---|---|---|---|
| 278596 | 3/1927 | Fed. Rep. of Germany | 209/129 |
| 1034718 | 4/1953 | France | 209/127 R |
| 218354 | 7/1924 | United Kingdom | 209/129 |
| 662463 | 12/1951 | United Kingdom | 209/128 |
| 697932 | 9/1953 | United Kingdom | 209/129 R |
| 729934 | 5/1955 | United Kingdom | 209/129 B |
| 296591 | 5/1967 | U.S.S.R. | 209/131 |
| 325033 | 3/1972 | U.S.S.R. | 209/129 |
| 564883 | 10/1974 | U.S.S.R. | 209/127 R |
| 522858 | 8/1976 | U.S.S.R. | 209/127 R |

OTHER PUBLICATIONS

Electrostatic Sepn of Mixed Granular Solids, Ralston, 1961, pp. 136, 140, 141, 70, 67.
Electrostatic Sep'n of Granular Matls, Bulletin 603, Bu. of Mines, 1962, p. 96.

*Primary Examiner*—Robert Halper
*Attorney, Agent, or Firm*—Schuyler, Banner, Birch, McKie & Beckett

[57] ABSTRACT

A method of treating a refuse fraction to separate a desired valuable constituent, such as a glass concentrate, is disclosed in which a particulate refuse fraction comprising glass, stones, metal and the like is fed to the top of a rotating support comprising a grounded conductive underlayer and a nonconductive overlayer and the particles are pinned to the rotating support by ion bombardment. The stone and metal particles tend to separate first from the roll while the glass particles have a greater tendency to remain pinned to the roll and can be collected as a separate fraction.

36 Claims, 2 Drawing Figures

METHOD OF TREATING REFUSE TO SEPARATE VALUABLE CONSTITUENTS

CROSS-REFERENCE TO RELATED APPLICATIONS

This application is a continuation-in-part of my co-pending application Ser. No. 852,740 now abandoned filed Nov. 18, 1977.

BACKGROUND OF THE INVENTION

High tension separation is a well established technique for classifying particulate materials such as mineral ores, shredded refuse, seeds and the like. In conventional practice separation is effected according to the electrical conductivities of the constituents of the particulate mixture. Usually, particles are fed to the top of a rotating, grounded, conductive roll or drum and are bombarded with ions from a corona discharge electrode to charge the particles on the roll surface so that they tend to adhere to the surface of the roll. The more conductive particles tend to lose their charge rapidly by conduction and soon separate from the roll under the influence of centrifugal force and the force of gravity. Less conductive particles tend to retain their charge and remain pinned to the roll for a longer period of time so that they can be collected as a separate fraction. Generally, the charged particles are subjected to a static field which assists in drawing away the conductive particles while holding the nonconductive particles to the rotating conductive roll.

Examples of such systems are disclosed in Grave, U.S. Pat. No. 2,072,501; Hewitt, U.S. Pat. No. 2,314,940; Johnson, U.S. Pat. No. 2,687,803; Roberts, U.S. Pat. No. 2,737,348; Breakiron, U.S. Pat. No. 3,322,275; and Barthelemy, U.S. Pat. No. 3,308,948. A modified system in which the grounded conductive roll is comprised of alternating disks of conductive and nonconductive material is disclosed in Payne, U.S. Pat. No. 994,870. Another modified system in which the roll is provided with a surface layer of highly resistive or semiconductive metal oxide is described in Fraas, U.S. Pat. No. 3,012,668. All of these systems depend on differences in the conductivities of the different materials to achieve separation.

In the recycling of waste materials it is necessary to separate valuable constituents from other materials in the refuse mixture. For example, glass is considered a valuable component of typical municipal refuse. Various techniques have been utilized in the prior art for separating glass from refuse. Pierson, U.S. Pat. No. 3,236,604 discloses a refuse recycling scheme in which large pieces of glass are hand picked from the refuse stream and small pieces of glass are removed along with ashes and dirt by screening. Such techniques are extremely inefficient and uneconomic. Rhys, U.S. Pat. No. 3,650,396 discloses a separation of glass from a waste material stream by air classification and optical sorting. In a similar vein, Marsh, U.S. Pat. No. 3,720,380 discloses separating glass from municipal waste by screening the material, passing the screened material through an air cyclone and then sorting out the glass particles with an optical sorter. The use of optical sorting is disadvantageous because the sorting equipment is complex and expensive and because the optical sorting equipment has a very limited capacity.

Bradbury, U.S. Pat. No. 3,941,684 discloses a scrap salvage system in which a conventional high tension separator is utilized to separate plastic and metal. Rhys, U.S. Pat. 3,897,330, Marsh, U.S. Pat. No. 3,945,575 and Webb, U.S. Pat. No. 4,116,822 disclose refuse recycling systems in which conventional high tension separators with conductive drum electrodes are utilized to separate glass from waste material. Conventional high tension separation can be used to produce a glass concentrate, but the efficiency of separation is still less than could be desired. The refuse must be reduced to a fairly small particle size if substantial amounts of refuse material are to be processed through the separator, and the refuse must also be dried to a very low moisture content.

The problem encountered in separating glass from other materials in a refuse mixture, especially stones, lies in the fact that both the stones and the glass have a very high electrical resistivity so that a conventional high tension separation which depends upon differences in electrical conductivity has a difficult time discriminating the two types of materials. Also stones and glass typically have similar densities, so that separation techniques which depend upon differences in density are not effective to achieve high quality separations. Appreciable amounts of non-glass material remaining in the glass concentrate from a conventional high tension separator must be removed by a subsequent sorting operation. Moreover, conventional high tension separation of glass from waste material requires that the waste material be dried before it is fed to the separator. Typical municipal refuse has an appreciable moisture content ranging up to 15 or 20 percent by weight. Also, treatment steps such as flotation separations which increase the moisture content of the stream of refuse are frequently utilized in refuse recycling systems. Drying both the valuable and nonvaluable components of a refuse prior to effecting a separation involves substantial expenditures of costly energy. It would be desirable if separator efficiency could be increased while at the same time eliminating the need for drying the particulate refuse.

OBJECTS OF THE INVENTION

Accordingly, it is an object of the present invention to provide a method for separating a valuable constituent such as glass from a mixture of particulate refuse material based on the characteristic shapes of the glass particles and the remaining materials.

It is also an object of the present invention to provide a method for separating a valuable constituent such as glass particles from a mixture of particular refuse materials which does not depend on differences in electrical conductivities to effect the separation.

It is a further object of the present invention to provide a high tension method for separating glass from stones.

Another object of the invention is to provide a high tension method for separating shredded plastic material from glass fragments.

Yet another object of the present invention is to provide a method for separating a valuable constituent such as glass from a mixture of particulate refuse materials which does not require drying the refuse particles.

It is also an object of the present invention to provide a method for separating a valuable constituent such as glass particles from moist refuse.

Another object of the invention is to provide a method for separating a desired valuable constituent from waste material which is more efficient at large particle sizes.

An additional object of the present invention is to provide a method of separating more nearly spherical particles from a mixture of particles of varying shape.

One more object of the present invention is to provide a method for separating a valuable constituent such as glass particles from a mixture of particulate refuse material in which the size of the apparatus utilized is appropriately matched to the particle size of the refuse material.

SUMMARY OF THE INVENTION

These and other objects of the invention are achieved by providing a method for separating a valuable constituent for a mixture of refuse particles comprising the steps of feeding the refuse particle mixture to a rotating support electrode comprising a grounded, conductive underlayer and a nonconductive overlayer; pinning the refuse particles to the rotating support by bombarding the particles on the support in a first zone along the path of rotation with ions from at least one ionizing electrode; and collecting a first particle fraction comparatively poor in valuable constituent particles and a second particle fraction comparatively rich in valuable constituent particles in second and third zones respectively along the path of rotation of the support as the particles separate from the rotating support.

BRIEF DESCRIPTION OF THE DRAWINGS

The invention will be described in greater detail with respect to the accompanying drawings wherein.

DETAILED DESCRIPTION OF THE PREFERRED EMBODIMENTS

It has now been discovered that high tension separation can be utilized to separate a desired valuable constituent such as glass particles from a refuse mixture if the separator roll is covered with a layer of nonconducting resin. This achievement is based on the discovery that the various particles such as glass particles and stone particles in the mixture tend to have different characteristic particle shapes. The material must be properly sized but need not be reduced to extremely small particle sizes. Particle sizes between the 10 mm and 50 mm are most effective. Glass particles tend to take the form of comparatively flat pieces. Stones tend to take a more nearly spherical particle shape. By treating the refuse fraction in a high tension separator having a nonconductive layer over the separator drum it is possible to separate the glass from the stones based on their characteristic particle shapes. Moreover, drying of the refuse mixture is not necessary. Moisture contents of up to about 20% by weight do not prevent effective separations.

Figure 1:
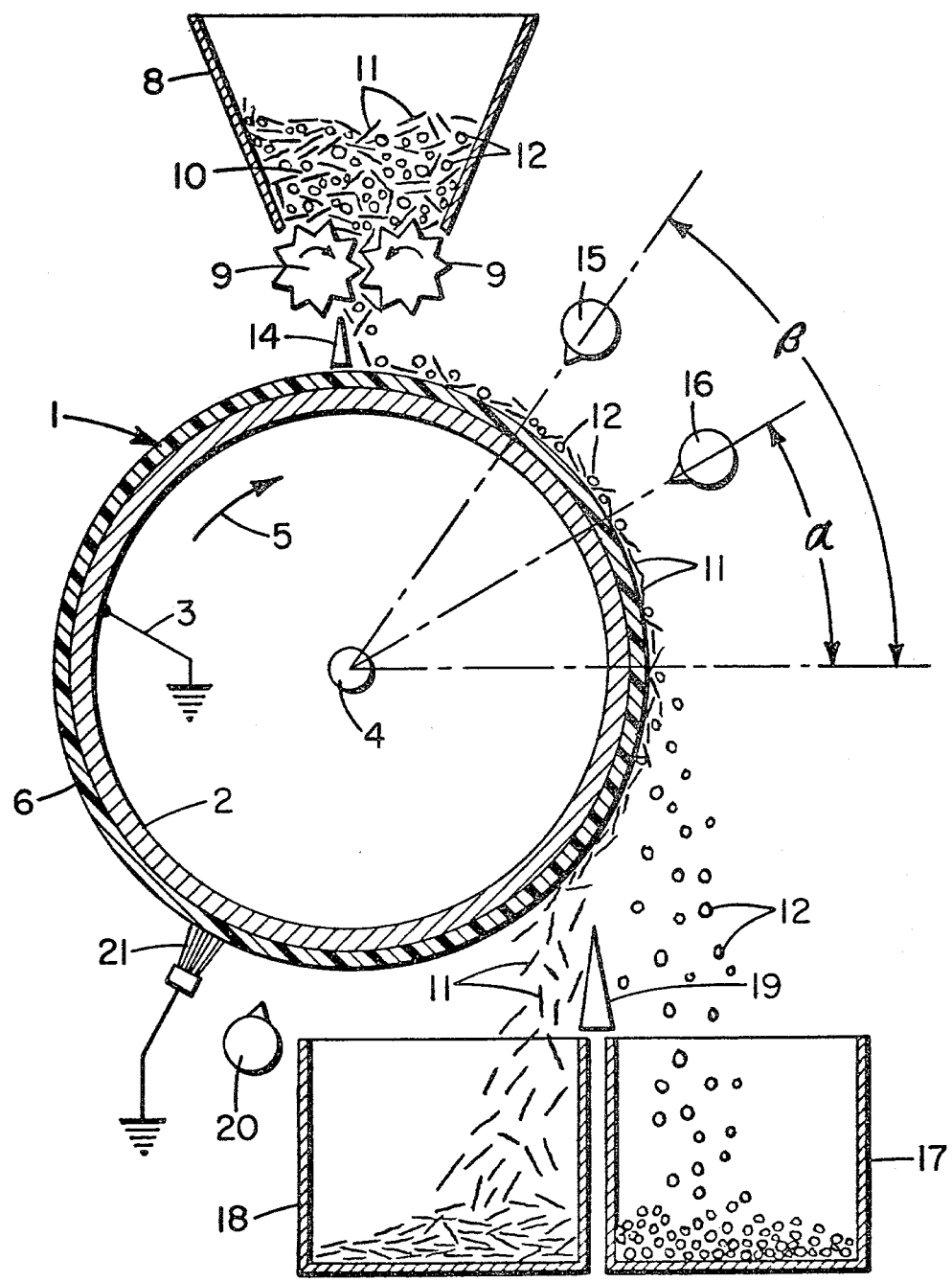
FIG. 1 is a schematic representation of apparatus for effecting shape separation according to the method of the present invention.

FIG. 1 shows a high tension separator 1 comprising a conductive steel roll 2 which is grounded as shown at 3. Roll 2 is mounted for rotation about a horizontal axis 4 in the direction indicated by arrow 5. Roll 2 may range in size from 200 to 1500 mm in diameter and may suitably be driven at speeds ranging from 2 to 100, preferably 5 to 75, most preferably 8 to 50 r.p.m. Roll 2 is provided with a nonconductive overlayer 6. Layer 6 may be a resinous synthetic polymer having insulating properties such as polyethylene, polypropylene or various polyurethanes. A particularly preferred material is chloro sulfonate polyethylene. Film-forming polyurethanes which are coated on the drum in solvent medium after which the solvent is evaporated to deposit a uniform insulating film extending over the drum surface are also very suitable. Other suitable materials include natural and synthetic rubber, extruded coatings of unsubstituted or halogenated thermoplastic polyolefins, (e.g., polytetrafluoroethylene), polyamides (e.g., polycaprolactam, polyhexamethylene adipamide), polycarbonates, polyesters (e.g., polyethylene terephthalate), phenolics (e.g., phenol formaldehyde or any other insulating resinous material. Ceramic coatings may also be utilized. Important properties of the nonconducting coating which govern the selection of a specific coating material are abrasion resistance, resistance to degradation by ozone generated by the corona electrodes of the separator, water resistance, temperature stability and ease of application. It is preferred that the nonconductive overlayer have a thickness of at least 0.25 mm up to 25.0 mm, preferably from 1.25 mm to 4.0 mm and a volume resistivity in excess of $10^{-1}$ ohm/cm, preferably greater than $10^8$ ohm/cm, most preferably from $10^{10}$ to $10^{17}$ ohm/cm, although insulating resin coatings having other values may be useful in certain applications.

A refuse feeding device 7 comprising a hopper 8 and a pair of spline feeder rolls 9 are positioned above roll 2 so as to deposit particulate refuse material at the top of the roll. Hopper 8 contains a refuse fraction from which paper, plastics and ferrous metals have already been removed to leave a mixture 10 of particulate material comprising relatively flat glass particles 11 and more nearly spherical stone particles 12. Preferably the refuse material is deposited either substantially directly above the axis about which the roll rotates or slightly forward thereof in the direction in which the top of the roll moves so that the particulate refuse will not slide down the back of the roll. A stationary blocking bar or dam 14 may be provided at the top of the roll to prevent refuse material from sliding down the back thereof. After they are deposited on the roll, particles 11 and 12 are carried along with roll 2 as it rotates.

Desirably, the particles will have a minimum size of at least 6 mm. Maximum particle size may range up to 50 mm or more depending on the materials and the parameters of operation. Preferably, the ratio of the maximum particle size to minimum size will not exceed about 5 to 1. For example, excellent separation of glass particles can be achieved when the particulate refuse has been screened so that the size of the particles varies from 10 to 50 mm. Generally, the larger the particles, the slower the rate of rotation of the support electrode should be.

Conventional high tension separators with conductive drum electrodes are most efficient at fine particle sizes less than 5 mm. If larger particles are processed, the rate of rotation of the drum electrode must be slowed down so that the throughput capacity of the separator is greatly reduced. In contrast thereto, the method of the invention is most effective at larger particle size greater than about 10 mm and has a much higher throughput capacity at large particle sizes.

For purposes of this discussion, refuse having a moisture content greater than 2% will be referred to a moist refuse. Refuse moisture contents up to about 20% by weight do not have any deleterious effect on the method of the invention. For ease in handling the particulate material in material handling equipment, it is preferred that the moisture content be 8% or less.

The particulate refuse material on the roll is bombarded with ions from an ion source such as D.C. corona discharge electrode 15. As the structure of such electrodes is well known in the art, it will not be described here in detail. Electrode 15 is connected to a source of D.C. potential ranging up to 45 or 50 kilovolts, preferably between 15 and 40 kilovolts and most preferably between 20 and 35 kilovolts. Filtered or unfiltered direct current produced by rectifying conventional 50/60 cycle alternating line current has been found to be suitable. The polarity of electrode 15 may be either positive or negative. Electrode 15 ionizes molecules of the surrounding air and directs a beam of such ions against the refuse material 10 on the surface of drum 2. This results in the refuse particles acquiring a charge having the same polarity as electrode 15.

Although the method of the invention may be denominated an "electrostatic" separation, the method is not electrostatic in the strictest sense of the term because there is some flow of current from the corona electrodes to the particles on the rotating support. Typical current flow will range from 0.2 to 10 milliamperes per meter of electrode length. The charged particulate refuse adheres to the surface of the rotating roll and in the vernacular of the art is said to be "pinned" to the roll. If desired, one or more additional corona electrodes such as second D.C. corona electrode 16 may be provided adjacent electrode 15 to assure that a uniform charge is deposited on the refuse particles upon the drum surface. Generally, the number of corona electrodes will be related to the diameter of the rotating support electrode; the larger the diameter, the greater the number of electrodes. Electrode 16 should have the same polarity as electrode 15 and desirably is of the same or higher potential than electrode 15. Electrodes 15 and 16 may be referred to as primary charging electrodes. Because of the nonconductive overlayer 6 on drum 2, the charge on the refuse particles does not dissipate regardless of the conductivity of the particles, but instead the charge is retained on the surface of the refuse particles. The density of the charge applied to the refuse particles depends upon the potential of the electrodes and the length of time to which the particles are exposed to ion bombardment. The total charge accumulated by any given particle varies with the size of the exposed surface area; the larger the available area, the greater the total charge accumulated. The accumulated charge causes the particulate refuse to tend to adhere to the rotating support.

The use of a rotating support electrode comprising a grounded conductive underlayer and a nonconductive overlayer makes it possible to develop a difference in potential between the inner and outer surfaces of the rotating support so that the charged refuse particles will adhere to the rotating support. The scope of the terms "conductive underlayer" and "nonconductive overlayer" is not intended to be limited to devices comprising distinct, discrete layers but is intended to embrace functional equivalents such as cast drums of nonconductive polymeric material in which the material adjacent the inner surface of the drum has been modified by incorporating particles of conductive material such as silver, nickel or carbon black therein.

Without being bound to any particular theory, it is believed that the charged refuse particles on the surface of the rotating support and the grounded conductive underlayer tend to act like the plates of a capacitor separated by the nonconductive overlayer; that the charge on the refuse particles tends to induce a charge of opposite polarity in the grounded conductive underlayer of roll 2; and that it is the interaction between these two opposite charges which is largely responsible for the adhesion of the refuse particles to the drum. The strength of the forces holding each particle to the drum depends on the magnitude of the charge on the particle and the proximity of the particle charge to the induced charge on the grounded conductive underlayer on the other side of the insulating layer from the charged particles. Consequently, a relatively flat glass particle with a large exposed surface area which sits comparatively tightly against the surface of the roll will be held strongly to the roll.

In contrast thereto, the forces tending to cause the refuse particles to separate from the roll are (1) the centrifugal force resulting from the rotation of the roll and (2) the force of gravity which effectively increases as the refuse particles pass from the top of the roll where their weight is wholly or partially supported by the roll to the underside of the roll where their weight is not supported at all by the roll. Both the magnitude of the centrifugal force and the magnitude of the gravitational force acting on the refuse particles depends on the mass of the particle. The greater the mass of the particle, the greater the force tending to cause the particle to separate from the roll.

In view of the foregoing considerations, it is apparent that comparatively flat glass particles with a high surface area to mass ratio will be subject to stronger forces tending to hold them against the roll and lesser forces tending to pull them away from the roll while spherical or more nearly spherical stone particles having a lower surface area to mass ratio will be subject to lesser forces tending to hold them against the roll and stronger forces tending to cause them to separate. Consequently, the flater glass particles can be separated from the more spherical stone particles. Similar considerations apply to separating even flatter, low density particulate materials such as shredded plastic sheeting from glass particles except that the glass particles then constitute the more spherical particle fraction.

It is understood that the term flat particles is not intended to be limited to particles which are absolutely flat. Likewise, the term spherical particles is not intended to be limited to particles which are perfectly spherical. Instead, these terms are intended to represent limiting cases in which the surface area to mass ratio of a particle of any given material will achieve maximum and minimum values respectively. In actual practice, it is understood that the refuse particles in all probability will be neither absolutely flat nor perfectly spherical but that the average particle shape of the glass particles will be more nearly flat; that is, have a higher surface area to mass ratio than the average particle shape of the stone particles which are more nearly spherical; that is, has a lower surface area to mass ratio.

The flatness of particles may be compared by computing a flatness coefficient for a typical or average particle of each material and then computing the ratio of the two coefficients. The flatness coefficient for a typical particle is determined by considering the particle resting upon a horizontal surface in the most stable position. The maximum dimension of the particle in the direction parallel to the surface upon which it is resting is taken as the particle length L. The maximum dimension of the particle in the direction perpendicular to the surface upon which it rests is taken as the particle thickness T. The flatness coefficient C is determined by dividing the length L by the thickness T. The greater the numerical value of the coefficient, the flatter the particle. The flatness ratio of two different materials in a particle mixture is determined by dividing the larger coefficient by the smaller coefficient (for a typical particle). Generally effective separations on the basis of particle shape can be carried out if the ratio of the flatness coefficients of typical particles of the materials in the mixture is greater than or equal to 2. Increasing efficiency may ordinarily be expected when the flatness ratio assumes larger numerical values. If the value of the flatness ratio is comparatively low, repeated passes through the separator may be desirable to increase the overall efficiency of the separation.

The speed of rotation of the roll affects both the magnitude of charge applied to the refuse particles by controlling the length of time which they are exposed to ion bombardment and also controls the amount of centrifugal force acting on the refuse particles. Lower speeds subject the refuse particles to ion bombardment for a greater period of time so that the magnitude of the charge accumulating on the particle surfaces is larger and the electrostatic forces holding the particles to the roll are greater. Higher roll speeds increase the centrifugal forces which tend to cause the refuse particles to separate from the roll. The amount of charge accumulated on the refuse particles also depends on the intensity of the ion beams which in turn is controlled by the potential of the electrodes. By appropriately adjusting the speed of the roll as well as the potential of the ionizing electrodes, it is possible to adjust the operating conditions of the method so that particles of one given surface area to mass ratio will separate from the roll while particles of a slightly higher surface area to mass ratio are retained on the roll.

Thus it is that the spherical or more nearly spherical stone particles 12 separate from the rotating roll and fall into container 17 while the flat or more nearly flat glass particles 11 tend to be retained on the roll and are deposited in container 18. A splitter 19 is provided adjacent the roll between containers 17 and 18 to deflect stone particles into bin 17. The splitter spacing, or distance between the top of the splitter and the rotating support, may range between 10 and 50 mm and the angular position of the splitter is suitably between 30 and 60 degrees, preferably between 30 and 45 degrees below the horizontal axis of the roll.

By appropriately selecting the speed of the rotating electrode and the potential of the primary charging electrodes it is possible to separate out a low density, very flat material such as shredded polyethylene plastic from a refuse mixture of plastic, glass and stone. The glass/stone fraction can then be treated at a slower speed of rotation and higher corona electrode potential to isolate separate glass and stone fractions.

The position of each of the ionizing electrodes is defined by the distance between the electrode and the surface of the roll and by the angle between a line joining the electrode and the center of the roll with a horizontal line through the center of the roll. In general, effective separations of glass particles from stones can be achieved when the electrode spacing ranges between 50 and 120 mm and the electrodes are lacked between 10° and 80° above horizontal. In the illustrated embodiment, two electrodes 15 and 16 are shown. In the drawing, the angular position of electrode 15 is indicated as angle beta and the angular position of electrode 16 as angle alpha. Preferably, beta will range between 40° to 80° and alpha between 10° and 60°. The electrode potential may range up to 45 to 50 kilovolts D.C., preferably between 15 and 40 kilovolts D.C. and most preferably between 20 and 35 kilovolts D.C.

It is highly desirable that the diameter of the rotating support electrode be appropriately related to the size of the particles being separated in order to maximize the contact between the surface of the rotating electrode and the relatively flat glass particles. Large roll diameters are more favorable when the size of the refuse particles, particularly the relatively flat glass particles, is larger because the larger circumference presents a flatter roll surface which mates better with the flat particles thereby enhancing the electrical interaction which is thought to cause the particles to adhere to the roll.

Consequently, the diameter of the rotating support electrode should increase the size of the glass and other refuse particles increases. It is preferred that the diameter of the rotating support be at least about 10 times the maximum particle size of the refuse particles. Most preferably, the diameter of the rotating electrode will range from 20 to 25 times the size of the largest refuse particles. Thus it has been found that when the nominal size of the glass particles ranges up to 25 mm, separation can be carried out effectively using drum electrodes from 250 to 500 mm in diameter. When the size of the glass particles ranges up to 50 mm, better separation response is obtained with rolls ranging from 450 to 1250 mm or more in diameter.

The rate at which particulate refuse material can be fed to the separator depends on the size of the refuse particles. Generally, the larger the size of the refuse particles, the greater the permissible rate of feed. Feed rates ranging from 30 to 150 pounds of refuse per hour per inch of roll length in the axial direction have been found acceptable. It is preferred that the rate of feed range between about 50 and about 90 pounds of refuse per hour per inch of roll length.

Various types of mechanisms may be utilized to feed the particulate refuse to the separator including gravity gate hoppers, conveyor belts, star spline feeders, vibratory feeders and electrostatic feeders. Conveyor systems and vibratory feeders are preferred for larger particles while electrostatic feeders are more suitable for finer particles.

Inasmuch as roll 2 is provided with a nonconductive outerlayer 6, charges applied to the surface of the roll from ionizing electrodes 15 and 16 tend to remain on the surface of the roll, and glass particles sometimes adhere to the roll past the point of intended discharge. It is generally desirable to bleed off such residual charges and remove adhering particles before the roll makes a complete revolution so that refuse particles from the feeding mechanism are not deposited on a charged surface or on top of adhering refuse particles. For this purpose, separator 1 is provided with a wiper electrode 20 which acts to partially neutralize or level out residual charges on the surface of the roll. Either an A.C. electrode or a D.C. electrode may be utilized although a D.C. electrode is preferred. The polarity of the D.C. wiper electrode should be opposite to the polarity of the primary charging electrodes 15 and 16. From 5 to 30 kilovolts potential may be applied to the wiper electrode 20. Preferably, the potential applied to the wiper electrode will range between 10 and 15 kilovolts.

A brush 21, which may be either rotating or stationary, is provided to assist in removing any remaining glass particles from the rotating support electrode. If desired, brush 21 may be made of electrically conductive material and grounded to assist in removing residual charges from the roll surface.

The simplest treatment scheme for practicing the method of the present invention is to pass a particulate refuse material mixture once through a high tension separator having a rotating roll provided with a nonconductive layer, as described above.

Figure 2:
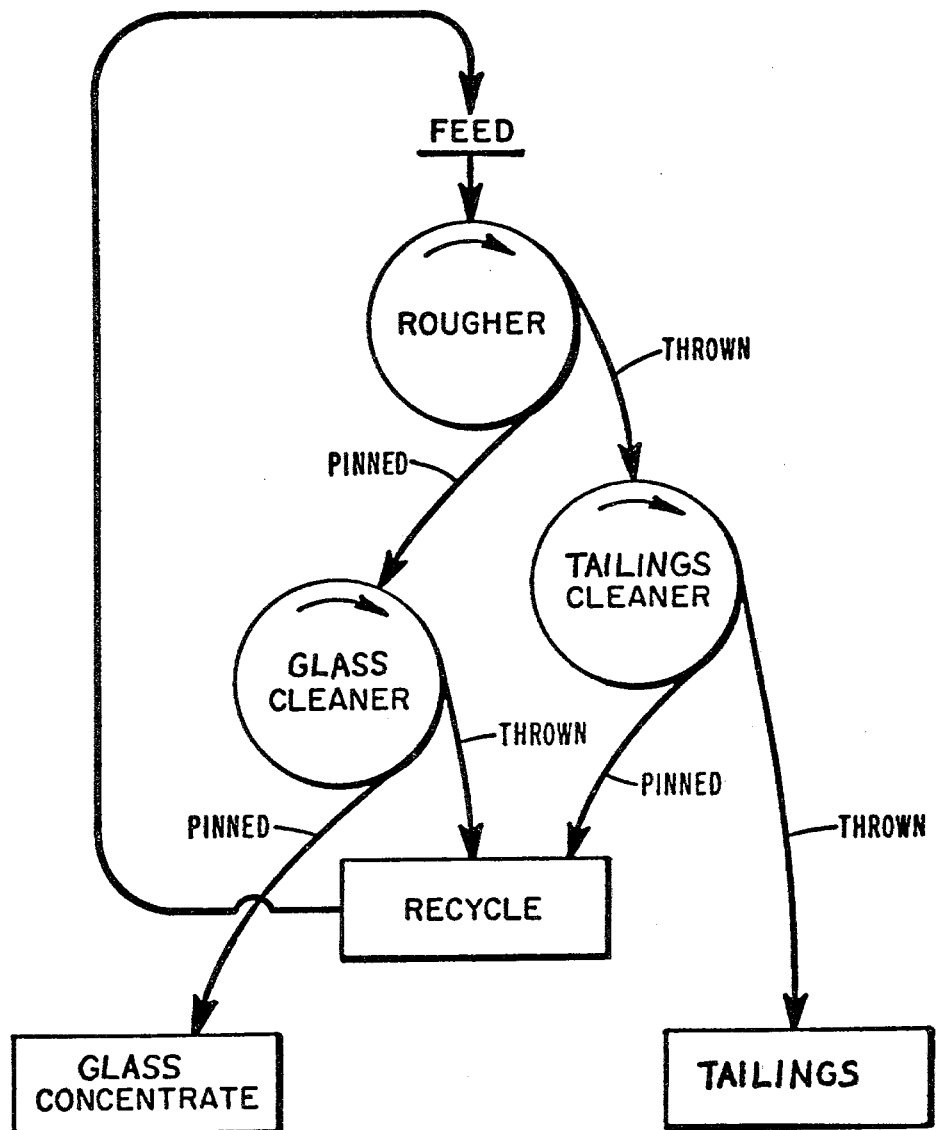
FIG. 2 is a schematic representation of a three-stage treatment scheme for carrying out the method of the present invention.

FIG. 2 depicts a slightly more complicated treatment scheme designed to isolate a high purity glass concentrate. Mixed particulate refuse feed material is first fed to a rougher separator where most of the more spherical stone particles are separated in the thrown fraction while the majority of the relatively flat glass particles and a small portion of the stone material are retained in the pinned fraction. The pinned fraction from the rougher stage is then passed to a cleaner separator where substantially all of the remaining stone particles are removed in the thrown material. The majority of the glass particles are retained in the pinned fraction of the cleaner stage to produce a high quality glass cullet concentrate. The thrown fraction from the rougher contains predominantly more spherical stone particles and is passed to a tailings cleaner stage. The thrown fraction from the tailings cleaner consists almost entirely of stone particles which can be discarded. The pinned material from the tailings cleaner and the thrown material from the glass cleaner are combined to form a middlings fraction which can be recycled to the feed material.

When more than one material is to be separated out from a refuse mixture, the mixture may be subjected to successive passes through the separator at progressively slower roll speeds and higher charging potentials to isolate a plurality of different fractions.

The method of the invention is highly energy efficient when compared to techniques such as sizing and air classification which have been used in the prior art to separate glass from refuse material. Over four horsepower per ton of refuse per hour are required to operate the glass recovery stage of a recycling plant utilizing grinding, screening and air classification. In contrast thereto, the glass recovery stage of a recycling plant utilizing the method of the present invention can be operated with less than one horsepower per ton of refuse per hour.

The method of the present invention has some unusual and surprising aspects. Conventional high tension separation which utilize conductive rolls and depend on differences in particle conductivity to effect separation are most effective at small particle sizes. Special measures such as very slow roll speeds which substantially reduce the capacity of the separating equipment have been required to process larger particles about 5 mm in size. In contrast there, the method of the present invention is more efficient at large particle sizes greater than about 10 millimeters. This ability to work more efficiently with larger particle sizes yields great savings in effort and expense required for particle size reduction and classification and also allows the use of higher roll speeds which greatly increase the capacity of the separation equipment.

Moreover, the method of the present invention is not sensitive to moisture as are conventional electrostatic or high tension separations. The method of the present invention is capable of processing moist refuse without loss of efficiency. In conventional separations it is ordinarily necessary to dry the refuse to a moisture content of about 2% or less by weight. The method of the invention performs satisfactory separations at moisture levels ranging up to as much as 20% by weight. Thus it is ordinarily not necessary to dry the refuse at all prior to treatment. This ability to dispense with drying operations also yields substantial cost savings for the process of the present invention.

The method of the invention is especially suitable for use in the glass recovery stage of a multi-stage municipal refuse recycling plant. For purposes of the following discussion it will be assumed that the refuse has been pulverized and sized and that ferrous metals and low density materials such as paper and plastics as well as the bulk of the nonferrous metals have been removed in the initial stages of recycling system. The remaining refuse fraction which serves as feed material for the glass recovery stage is an inert particulate mixture comprising principally glass and stones with small amounts of nonferrous metal.

Further aspects of the invention will be apparent from a consideration of the following examples.

EXAMPLE 1

A sample of inert particulate refuse having a particle size distribution from 12.7 millimeters to 25 millimeters was treated on a high tension separator equipped with a 350 millimeter (14 inch) grounded drum provided with a nonconducting chlorosulfonate polyethylene coating. Refuse particles on the drum were bombarded with ions from two 21 kilovolt negative D.C. corona electrodes. The first electrode was disposed at an angle of 72 degrees above the horizontal centerline of the drum, and the second electrode was disposed at an angle of 50 degrees above the horizontal centerline of the drum. Both electrodes were spaced approximately 40 millimeters (1½ inches) from the drum surface. A splitter was positioned beneath and to the side of the drum spaced two inches from the drum surface. The drum was rotated at a rate of 60 rpm, and particulate refuse was fed to the top of the drum from a vibratory feeder at a rate of approximately 80 pounds of refuse per hour per linear inch of roll length. The glass and stone mixture was subjected to a single pass through the separator. The results of the test are shown in Table I.

TABLE I

| Material | Weight | | Assay % | | Distribution % | |
| Fraction | Grams | % | Glass | Stone | Glass | Stone |
| --- | --- | --- | --- | --- | --- | --- |
| Refuse Feed | 553 | 100 | 57.5 | 42.5 | 100 | 100 |
| Glass Concentrate | 252 | 46 | 98.4 | 1.6 | 78 | 2 |
| Stone Tailings | 301 | 54 | 23.3 | 76.7 | 22 | 98+ |

From the table it can be seen that in a single pass through the separator a high purity glass concentrate was successfully isolated from the initial refuse mixture. Further improvement can be achieved by subjecting the material to additional passes through the separator.

EXAMPLE 2

For comparison purposes, the sample of Example 1 was reconstituted from the separated fractions and passed once through a conventional high tension separator having a conductive steel drum electrode. All conditions were identical to the conditions of Example 1 except for the lack of an insulating coating on the separator drum. The results of the comparative test are shown in Table II.

TABLE II

| Material Fraction | Weight Grams | Weight % | Assay % Glass | Assay % Stone | Distribution % Glass | Distribution % Stone |
|---|---|---|---|---|---|---|
| Refuse Feed | 555 | 100 | 57.8 | 42.8 | 100 | 100 |
| Glass Concentrate | 197 | 36 | 93.9 | 6.1 | 58 | 5 |
| Stone Tailings | 358 | 64 | 38.0 | 62.0 | 42 | 95 |

From the table it can be seen that the glass concentrate fraction contains nearly four times as high proportion of stone as was obtained when a separator provided with a nonconductive coating over the drum was used. Further, only about ¾ as much of the total glass in the sample was recovered in the concentrate fraction.

EXAMPLE 3

A mixture of assorted flat pieces of plastic ranging in size from ½ inch to ⅞ inch and spherical pieces of glass approximately 3/16 inch in diameter was passed through an electrostatic separator with a nonconductive urethane coated 350 millimeter (14 inch) diameter roll rotating at 27 rpm, and the particles on the roll were bombarded with ions from two 25 kilovolt D.C. corona electrodes. The first electrode was positioned 43° above the horizontal centerline of the roll and 3 3/16 inches from the roll surface, while the second electrode was positioned 20° above the roll center line and 2 13/16 inches from the roll surface. The splitter was located in a usual position underneath and at the side of the roll at a distance of 1 3/16 inches. Results of the test are shown in Table III.

TABLE III

| Material Fraction | Weight Grams | Weight % | Assay % Plastic | Assay % Glass | Distribution % Plastic | Distribution % Glass |
|---|---|---|---|---|---|---|
| Raw Mixture | 459.3 | 100.0 | 20.6 | 79.4 | 100.0 | 100.0 |
| Plastic Product | 96.2 | 20.9 | 82.0 | 18.0 | 83.5 | 4.7 |
| Glass Tailings | 363 | 79.1 | 4.3 | 95.7 | 16.5 | 95.3 |

From the table it can be seen that over 83% of the plastic material was isolated in the pinned fraction, and over 95% of the glass was isolated in the thrown fraction. This test establishes that the method and apparatus of the present invention can effect a useful separation of two nonconductive refuse constituents from a refuse mixture on the basis of differences in particle shape where the glass particles have the more nearly spherical shape.

EXAMPLE 4

A mixture of coarse stones and glass particles each varying in size from ½ inch to ¾ inch obtained in the processing of municipal waste was fed to an electrostatic separator having a 350 millimeter (14 inch) diameter roll provided with a nonconductive urethane coating rotating at 27 rpm. The mixed particles on the rotating roll were bombarded with ions from two 25 kilovolt D.C. corona electrodes. The first electrode was positioned 43° above the horizontal centerline of the roll and 3 3/16 inches from the roll surface while the second electrode was positioned 20° above the roll centerline and 2 13/16 inches from the roll surface. The splitter spacing was 1 13/16 inches. The pinned fraction from the first pass was fed again through the separator under similar operating conditions except the roll speed was increased to 32 rpm, the electrode potential was increased to 30 kilovolts and the splitter spacing was increased to 1 5/8 inches. Results of the test can be seen from Table IV.

TABLE IV

| Material Fraction | Weight Grams | Weight % | Assay % Glass | Assay % Stones | Distribution % Glass | Distribution % Stones |
|---|---|---|---|---|---|---|
| Raw Mixture | 596.7 | 100.0 | 57.9 | 42.1 | 100.0 | 100.0 |
| Glass Product | 272.7 | 45.7 | 96.1 | 3.9 | 75.9 | 4.2 |
| Middlings | 34.0 | 5.7 | 60.9 | 39.1 | 6.0 | 5.3 |
| Stone Tailings | 290.0 | 48.6 | 21.6 | 78.4 | 18.1 | 90.5 |

From the table it can be seen that over 75% of the glass in the original mixture was recovered in the final pinned concentrate fraction which contained over 96% glass. The process and apparatus of the invention are thus shown to be useful in separating recyclable glass from processed refuse materials.

EXAMPLE 5

For comparison purposes, the sample of Example 4 was reconstituted from the separated fractions and passed once through a conventional high tension separator having a conductive steel roll surface not provided with an insulating coating under conditions otherwise corresponding to the first pass in test 4. The results of the comparative test are seen in Table V.

TABLE V

| Material Fraction | Weight Grams | Weight % | Assay % Glass | Assay % Stone | Distribution % Glass | Distribution % Stone |
|---|---|---|---|---|---|---|
| Raw Mixture | 573.2 | 100.0 | 58.6 | 41.4 | 100.0 | 100.0 |
| Glass Fraction | 96.9 | 16.9 | 95.1 | 4.9 | 27.5 | 2.0 |
| Stone Fraction | 476.4 | 83.1 | 51.1 | 48.9 | 72.5 | 98.0 |

From the table it can be seen that nearly ¾ of the glass was thrown from the roll with the stone fraction. This test clearly illustrates the significance of the insulating coating on the rotating separator roll.

The increased efficiency of the method of the present invention at larger particle sizes makes it possible to efficiently process larger size material at greater throughput rates. This yields substantial savings in the expenditure of energy and effort required to pulverize and classify the refuse material and also reduces the size of installation required to process a given amount of refuse thereby decreasing the initial investment costs as well as the operating costs. The ability of the method of the invention to classify moist refuse also yields great savings by substantially or completely eliminating the need for drying the refuse.

The foregoing examples have been given merely as illustrations of the method an apparatus of the present invention and are not to be construed as limiting the scope of the invention. As modifications of the illustrative examples within the scope and spirit of the present invention are likely to occur to others skilled in the art, the scope of the invention is to be limited solely by the scope of the appended claims.

I claim:

1. A method of treating a refuse fraction to separate a desired valuable constituent comprising the steps of:

feeding a particulate refuse fraction particle size of at least about 6 millimeters, a portion of relatively flat particles and a moisture content not exceeding about 20% by weight to a rotating support electrode comprising a grounded, conductive underlayer and a nonconductive overlayer;

pinning the refuse particles to the rotating support by bombarding the particles on the support in a first zone along the path of rotation of the support with ions from at least one ionizing electrode; and collecting one particle fraction comparatively poor in the desired constituent particles and another particle fraction comparatively rich in the desired constituent in second and third zones along the path of rotation of the support as the particles separate from the rotating support.

2. A method as recited in claim 1 wherein the refuse fraction comprises principally glass particles, stones and small amounts of nonferrous metal and the desired constituent is glass.

3. A method as recited in claim 1 wherein said ionizing electrode is a D.C. corona discharge electrode energized to a potential between about 15 and about 40 kilovolts.

4. A method as recited in claim 3 wherein said corona discharge electrode is energized to a potential between 20 and 35 kilovolts.

5. A method as recited in claim 3 wherein said electrode is energized by an unfiltered, rectified alternating current power supply.

6. A method as recited in claim 1 wherein said rotating support comprises a cylindrical roll from 250 to 1250 mm. in diameter rotating at a rate from 2 to 100 rpm.

7. A method as recited in claim 6 wherein said roll rotates at a rate from 8 to 50 rpm.

8. A method as recited in claim 1 wherein said refuse particles have a minimum particle size of at least 10 mm.

9. A method as recited in claim 8 wherein the size of said refuse particles varies from 10 to 50 mm.

10. A method as recited in claim 9 wherein the size of said particles varies from 20 to 50 mm.

11. A method as recited in claim 1 wherein the ratio of the average flatness coefficient of the relatively flat particles to that of the remaining particles is at least 2.

12. A method as recited in claim 1 wherein said nonconductive overlayer has a thickness of at least 0.25 mm and a volume resistivity in excess of $10^8$ ohm/cm.

13. A method as recited in claim 12 wherein said overlayer has a thickness between 1.25 and 4 mm and a volume resistivity from $10^{10}$ to $10^{17}$ ohm/cm.

14. A method as recited in claim 12 wherein said nonconductive layer is a sheet or film of an insulating resin.

15. A method as recited in claim 14 wherein said resin is selected from the group consisting of polyurethanes, polyamides, polycarbonates, polyesters, phenolics, natural and synthetic rubbers, and unsubstituted and substituted polyolefins.

16. A method as recited in claim 15 wherein said resin is a chloro sulfonate polyethylene.

17. A method as recited in claim 14 wherein said resin is a modified resin incorporating conductive particles.

18. A method as recited in claim 17 wherein said particles are selected from the class consisting of silver, nickel and carbon black.

19. A method as recited in claim 1 wherein the method is repeated for at least one of the collected fractions to produce a concentrate fraction and a middlings fractions.

20. A method as recited in claim 19 wherein said middlings fraction is recycled to the original feed material.

21. A method as recited in claim 19 wherein the fraction comparatively rich in relatively flat particles is retreated.

22. A method as recited in claim 19 wherein the fraction comparatively poor in relatively flat particles is retreated.

23. A method as recited in claim 1 further comprising the step of treating the surface of said rotating support to remove residual charges and adhering refuse particles.

24. A method as recited in claim 23 wherein said treatment to remove residual charges is effected by bombarding the surface of the rotating support with ions from a D.C. corona discharge electrode of opposite polarity from the primary charging electrodes.

25. A method as recited in claim 1 wherein said rotating support is a cylindrical roll rotating about a horizontal axis and said ionizing electrode is located from 50 to 120 mm from the roll surface and between 10 and 80 degrees above the horizontal axis of the roll.

26. A method as recdited in claim 1 wherein said rotating support is a cylindrical roll rotating about a horizontal axis and said first and second particle fractions are divided from each other by means of a splitter located from 10 to 50 mm from the roll surface and between 30 and 45 degrees below the horizontal axis of the roll.

27. A method as recited in claim 1 wherein said refuse particles on said support are bombarded with ions from at least two adjacent ionizing electrodes.

28. A method as recited in claim 1 wherein said particulate refuse is fed to said rotating support at a rate of from 10 to 150 lbs. of refuse per hour per inch of axial length of the support.

29. A method as recited in claim 28 wherein said feed rate is between 50 and 90 pounds per hour per inch.

30. A method as recited in claim 1 wherein the diameter of the rotating support electrode is at least about 10 times the nominal maximum size of the refuse particles.

31. A method as recited in claim 30 wherein the diameter of the rotating support electrode lies in the range from about 20 to about 25 times the nominal maximum size of the refuse particles.

32. A method as recited in claim 1 wherein the energy consumption is less than one horsepower per ton of refuse per hour.

33. A method as recited in claim 1 wherein the refuse is moist.

34. A method as recited in claim 33 wherein the moisture content of the refuse ranges up to about twenty percent by weight.

35. A method as recited in claim 34 wherein the moisture content of the refulse is from two to eight percent by weight.

36. A method as recited in claim 1 wherein the refuse material is subjected to successive passes through the separator at progressively slower roll speeds and higher charging electrode potentials.

* * * * *

UNITED STATES PATENT AND TRADEMARK OFFICE
CERTIFICATE OF CORRECTION

PATENT NO. : 4,251,353
DATED : February 17, 1981
INVENTOR(S) : Frank S. Knoll

It is certified that error appears in the above—identified patent and that said Letters Patent is hereby corrected as shown below:

Column 4, line 67, "a" should read -- as --;

Column 8, line 1, "lacked" should read -- located --;

Column 8, line 6, "to" should read -- and --;

Column 8, line 24, after "increase" insert -- as --;

Claim 1, line 3, after "fraction" insert -- having a --;

Claim 35, line 2, "refulse" should read -- refuse --.

Signed and Sealed this

Seventeenth Day of August 1982

[SEAL]

Attest:

Attesting Officer

GERALD J. MOSSINGHOFF

Commissioner of Patents and Trademarks